(12) United States Patent
Giaretta et al.

(10) Patent No.: US 7,245,835 B1
(45) Date of Patent: Jul. 17, 2007

(54) DIGITAL AND PROGRAMMABLE CONTROL OF OPTICAL TRANSCEIVER ELEMENTS

(75) Inventors: Giorgio Giaretta, Mountain View, CA (US); Andreas Weber, Los Altos, CA (US); Dan Case, Gilroy, CA (US)

(73) Assignee: Finisar Corporation, Sunnyvale, CA (US)

( * ) Notice: Subject to any disclaimer, the term of this patent is extended or adjusted under 35 U.S.C. 154(b) by 573 days.

(21) Appl. No.: 10/282,580

(22) Filed: Oct. 29, 2002

(51) Int. Cl.
*H04B 10/00* (2006.01)
(52) U.S. Cl. .................... 398/136; 398/138; 398/164
(58) Field of Classification Search ............. 398/135, 398/136, 138, 164
See application file for complete search history.

(56) References Cited

U.S. PATENT DOCUMENTS

| | | | |
|---|---|---|---|
| 5,479,288 A | 12/1995 | Ishizuka et al. | |
| 5,537,093 A | 7/1996 | Aunon et al. | |
| 5,878,015 A | 3/1999 | Schell et al. | 369/116 |
| 5,956,168 A | 9/1999 | Levinson et al. | |
| 6,021,144 A | 2/2000 | Meyer et al. | 372/38 |
| 6,130,562 A | 10/2000 | Bosch et al. | 327/109 |
| 6,446,867 B1* | 9/2002 | Sanchez | 235/454 |
| 6,665,498 B1* | 12/2003 | Jiang et al. | 398/135 |
| 2002/0181894 A1* | 12/2002 | Gilliland et al. | 385/88 |

FOREIGN PATENT DOCUMENTS

WO   WO 01/48471 A2   7/2001

* cited by examiner

Primary Examiner—Dalzid Singh
(74) Attorney, Agent, or Firm—Workman Nydegger (57) ABSTRACT

An optical transceiver device having digital and programmable control over transceiver components is disclosed. The optical transceiver module comprises a controller and an integrated post-amplifier/laser driver ("PA/LD"), which are included on a printed circuit board disposed in the module. Transmitting and receiving optical sub-assemblies for transceiving optical signals are also disposed in the module. A digital signal interface interconnects the controller with the integrated PA/LD. A microprocessor is interposed between the controller and the PA/LD and is connected to both components via the digital signal interface. Digital control signals produced by the controller are transmitted via the digital signal interface to the integrated PA/LD where they are converted to analog signals for use by a plurality of control amplifiers. Conversely, analog feedback signals produced by the control amplifiers are converted to digital signals and transmitted to the controller. The microprocessor can intercept, analyze, and modify the digital control and feedback signals for optimum use by the controller or integrated PA/LD.

37 Claims, 5 Drawing Sheets

DIGITAL AND PROGRAMMABLE CONTROL OF OPTICAL TRANSCEIVER ELEMENTS

BACKGROUND OF THE INVENTION

1. The Field of the Invention

The present invention generally relates to optical transceivers. In particular, the present invention relates to structures and methods for digitally and programmably controlling various operational parameters of optical transceivers.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. An optical transceiver at the transmission node receives an electrical signal from a network device, such as a computer, and converts the electrical signal via a laser to an optical signal. The optical signal can then be transmitted in a fiber optic cable via the optical network, such as a LAN backbone, for instance. The optical signal is then received by a reception node of the network. Once received by the reception node, the optical signal is fed to another optical transceiver for conversion into electrical signals. The electrical signals are then forwarded to a host device, such as a computer, for processing. The optical transceivers described above have both signal transmission and reception capabilities; thus, the transmitter portion of the transceiver converts an incoming electrical signal into an optical signal, whereas the receiver portion of the transceiver converts an incoming optical signal into an electrical signal.

The majority of components included in the optical transceiver are disposed on a printed circuit board ("PCB"). These components include a controller, which governs general operation of the transceiver, a laser driver for controlling operation of the laser in the transmitter portion, and a post-amplifier for controlling the conversion of incoming optical signals into electrical signals in the receiver portion. These components are typically disposed as integrated circuits on the PCB.

The controller is operably connected to both the laser driver and the post-amplifier in order to govern their operation and to ensure proper transceiver function. In particular, the controller is responsible for controlling one or more parameters associated with these components during operation of the transceiver. Examples of these operational parameters include the rise time and amplitude of the electrical data signal that is conditioned by the laser driver, the rise time and amplitude of the data signal conditioned by the post-amplifier, and hysteresis and threshold set points for loss of signal detection circuitry in the post-amplifier. Each of these operational parameters is adjusted by a control device, such as a control amplifier, that is disposed on either the post-amplifier or the laser driver. In known systems, the controller controls the operational parameters via a plurality of analog signal lines that interconnect the controller with the respective control amplifier disposed on the laser driver or the post-amplifier. Because of their analog nature, one analog control line extending between the controller and the respective control amplifier is typically required for each parameter over which control is desired. This creates added complexity and expense to the design and manufacture of the transceiver PCB. Additionally, this requires each IC to be larger in size.

In addition to the above, known optical transceivers, given the speed at which their controllers must operate in many high-speed optical networks, are unable to perform detailed analysis or manipulation of data relating to the parameters associated with transceiver components. This fact hinders the capability of such transceivers.

There is therefore a need for an optical transceiver that enables control over operational parameters while minimizing the complexity and cost of the transceiver. A need also exists for a transceiver that is capable of programmable analysis and manipulation of control parameters associated with transceiver components at a rate that is compatible with high-speed optical communication networks.

BRIEF SUMMARY OF THE INVENTION

Briefly summarized, embodiments of the present invention are directed to an optical transceiver device having digital and programmable control of various parameters associated with operation of the device. The digital control design of the present transceiver device enables it to be manufactured with minimum complexity, thereby enhancing its economy. Digital control of the transceiver device also allows the functionality of the device to be expanded by providing additional elements of control and monitoring of device functions. Furthermore, programmable control of the transceiver device enhances its performance by enabling operational parameters to be manipulated in a manner not possible with known transceivers.

In one embodiment, the present optical transceiver comprises a controller chip coupled to a laser driver and post-amplifier. Each of these components is disposed on a printed circuit board, which is at least partially contained within a transceiver module housing. The laser driver and post-amplifier are preferably integrated as a single component on the printed circuit board, providing certain operational advantages and economy. The integrated laser driver/post-amplifier govern the operation of both a transmitter optical sub-assembly, which is used to convert an electrical data signal into a modulated optical signal and transmit it to an optical communications network, and a receiver optical sub-assembly, which receives modulated optical signals from the network and converts them back to electrical data signals for use by one or more connected components. The transmitter and receiver optical sub-assemblies, the integrated laser driver/post-amplifier, and the controller are interconnected so as to function together in transmitting and receiving optical signals.

A digital interface is established between the controller and the laser driver/post-amplifier to enable digital control of transceiver elements. The digital interface comprises digital serial interface nodes disposed on both the controller and the integrated laser driver/post-amplifier, with digital signal lines disposed therebetween. Preferably, three digital signal lines for transmitting data, enable, and clock signals are disposed between the digital interface nodes. A programmable device, such as a microprocessor, is interconnected with both the controller and the integrated post-amplifier/laser driver via the digital serial interface. Disposal of the microprocessor in this location enables it to perform specified operations on digital control signals and digital feedback signals that are transmitted between the post-amplifier/laser driver and the controller via the digital serial interface.

During operation of the optical transceiver, the controller issues digital control signals intended for use by one of a plurality of control devices disposed in the laser driver/post-amplifier. These digital control signals are relayed from the controller's serial interface node to the laser driver/post-amplifier serial interface node via the digital signal data line. After receipt by the laser driver/post-amplifier interface node, the digital control signal is distributed to one of a plurality of digital-to-analog converters disposed on the laser driver/post-amplifier. A glue logic device also disposed on the laser driver/post-amplifier selects the appropriate digital-to-analog converter to be used in converting the digital control signal. The digital control signal is converted by the digital-to-analog converter into an analog control signal, then relayed to the appropriate control device of the laser driver/post-amplifier, such as a control amplifier, or other device. The analog control signal is used by the control device to modify a specified operational parameter related to the post-amplifier/laser driver. Examples of such operational parameters include the amplitude or rise time of the data signal transmitted or received by the transceiver, and loss of signal threshold settings for received data signals, among others.

One or more of the control devices disposed on the post-amplifier/laser driver can be further configured to produce analog feedback signals. The analog feedback signals can be converted to digital feedback signals before being transmitted to the microprocessor via the digital serial interface. Once received by the microprocessor, the digital feedback signals can be manipulated in accordance with specified operations that are loaded as instructions into the microprocessor. For example, the microprocessor can perform complicated algorithmic calculations using data contained in the feedback signals, such as temperature data for the transmitter sub-assembly. The results of the calculations can then be forwarded via the digital serial interface to the controller. Using this manipulated feedback data, the controller can issue subsequent control signals that are based on the feedback data, thereby enabling more precise monitoring and control of the transceiver than what is typically possible. This implementation therefore provides the present transceiver with high-speed data processing and real-time monitoring capabilities not possible in typical transceivers.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
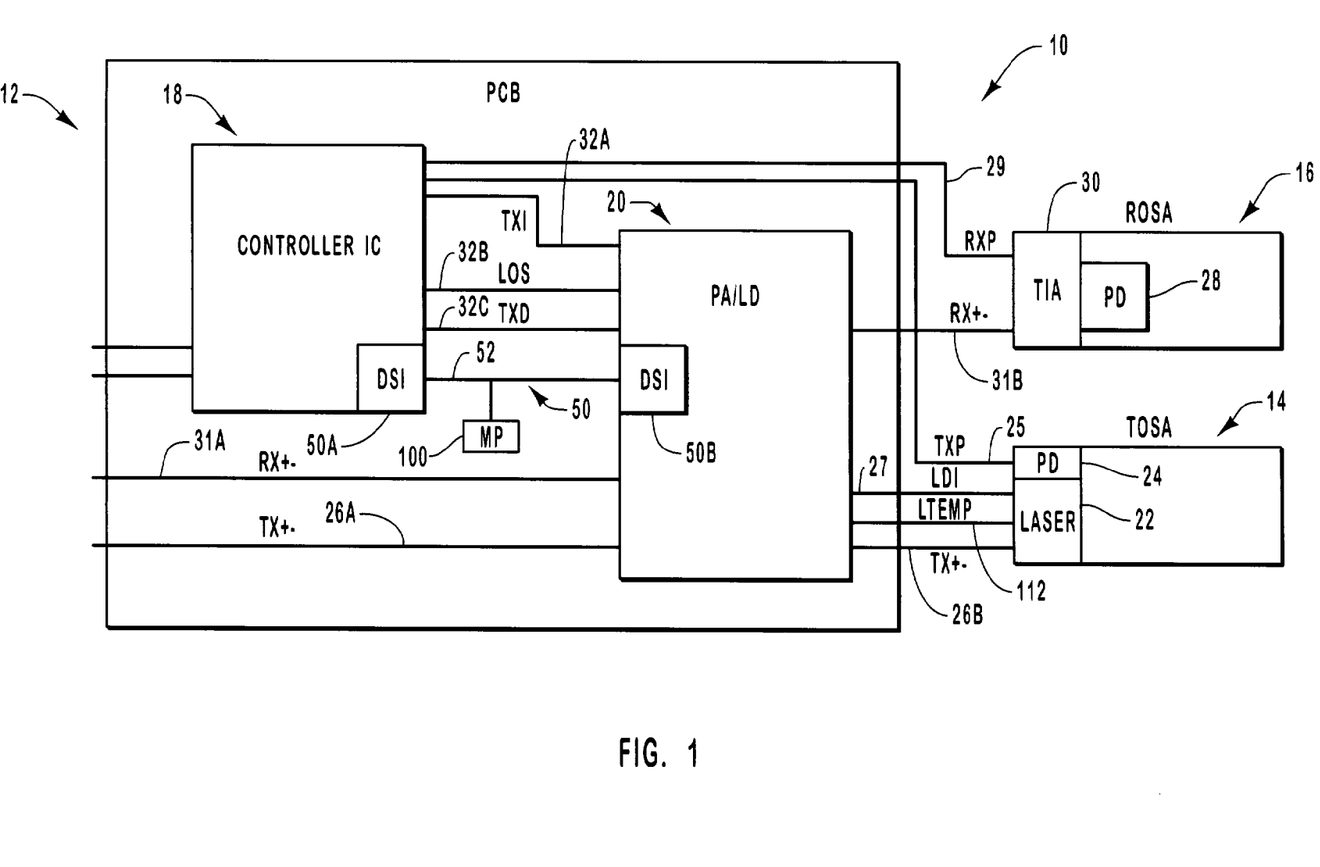
FIG. 1 is a schematic view of various components included in an optical transceiver manufactured in accordance with one embodiment of the present invention.
Figure 2:
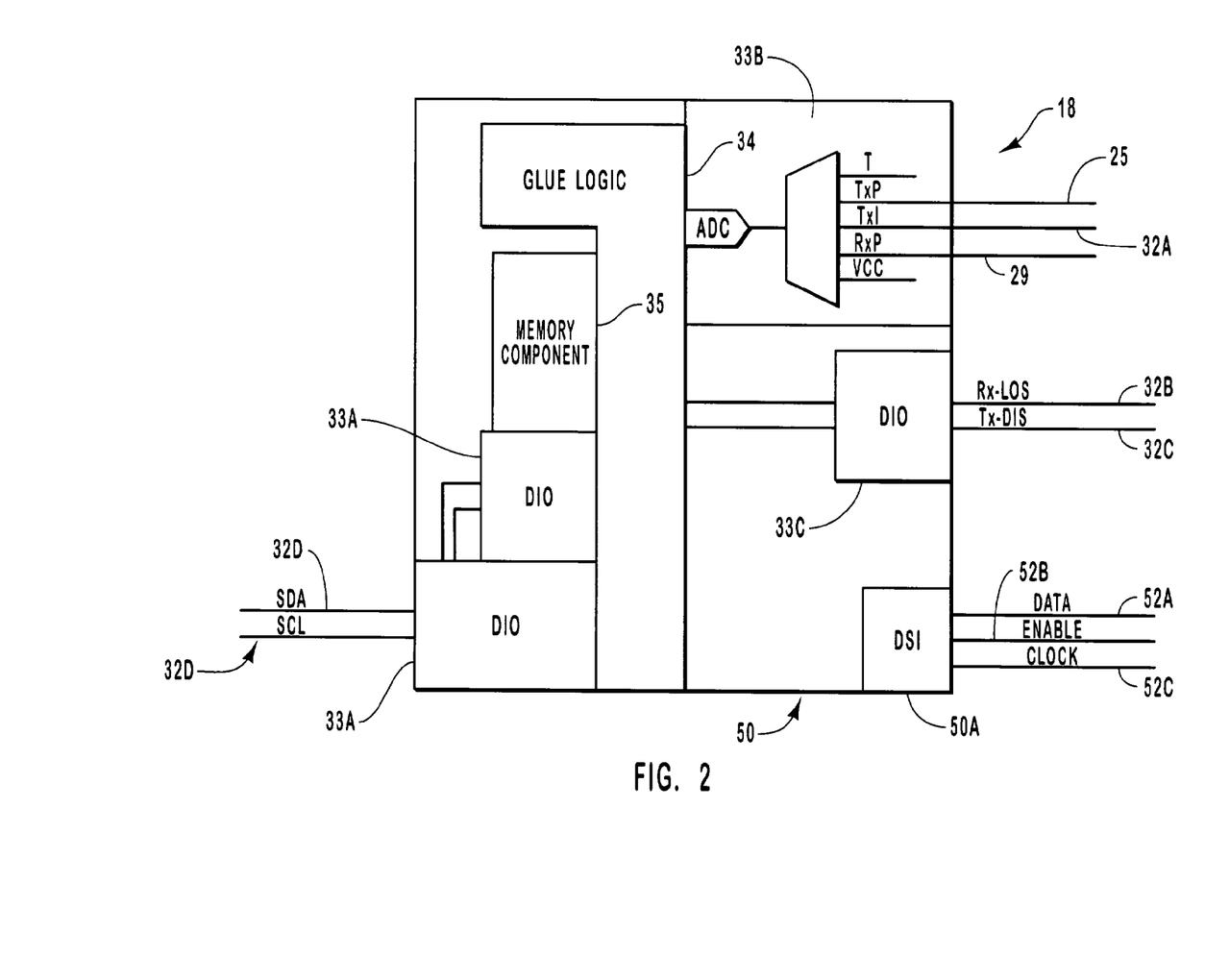
FIG. 2 is a schematic view of the controller of FIG. 1, configured in accordance with one embodiment of the present invention.
Figure 3:
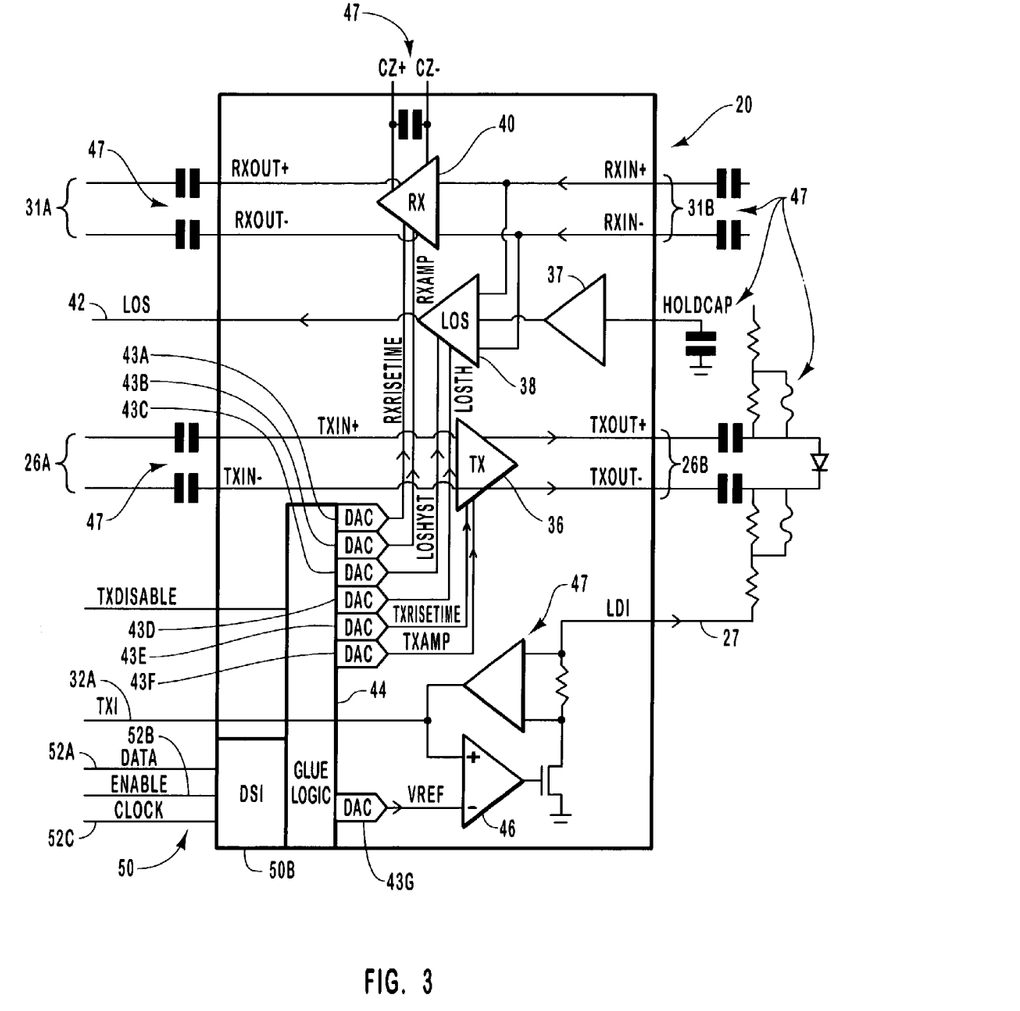
FIG. 3 is a schematic view of the post-amplifier/laser driver of FIG. 1, configured in accordance with one embodiment of the present invention.

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale. FIGS. 1-3 depict various features of embodiments of the present invention, which is generally directed to an optical transceiver that is configured to enable digital control of various operating parameters of the transceiver.

Reference is first made to FIG. 1, which depicts various components included in an optical transceiver, generally designated at 10. The transceiver 10 generally includes a printed circuit board ("PCB") 12, a transmitter optical subassembly ("TOSA") 14, and a receiver optical subassembly ("ROSA") 16.

Both the TOSA 14 and the ROSA 16 are electrically connected to a controller 18 and a post-amplifier/laser driver ("PA/LD") 20, which are in turn disposed on the PCB 12. Generally, these components cooperate to enable the transceiver 10 both to transmit and to receive optical signals that travel via an optical communications network (not shown). For instance, the PA/LD 20 is responsible for conditioning data signals that are to be transmitted by the TOSA 14, as well as conditioning data signals received by the ROSA 16. As will be explained, the controller 18 is responsible for governing the operation of the TOSA 14, ROSA 16, and other components that comprise the optical transceiver 10.

In greater detail, the PA/LD 20 can receive an electrical data signal to be transmitted from a connected device, such as a computer (not shown), via line 26A. The PA/LD 20 conditions that signal for receipt by the TOSA 14 via line 26B. A laser 22, disposed in the TOSA 14 and powered by a DC current that is conducted via current line 27 (indicated by "LDI" for "laser driver current"), receives the conditioned electrical data signal and converts it into an optical data signal for transmission to the optical communications network. A photo diode 24 is also disposed in the TOSA 14 to monitor the operation of the laser 22. Specifically, the photo diode 24 can communicate data relating to the light power with which the laser 22 is transmitting to the controller 18 via a communication line 25, indicated by "TXP" for "transmitter power."

Analogous to the above discussion, an incoming optical data signal from the optical communications network can be received by the optical transceiver 10 into the ROSA 16. A photo diode 28 and amplifier 30 in the ROSA 16 cooperate to convert and initially amplify the optical data signal into an electrical data signal, which is then forwarded to the PA/LD 20 via line 31B for conditioning before being forwarded to a connected device, such as a computer (not shown) via line 31A. Information regarding the power at which the ROSA 16 is receiving the optical data signal from the communications network can be relayed to the controller 18 via a communication line 29, indicated by "RXP" for "receiver power."

As shown in FIG. 1, The PA/LD 20 and the controller 18 are interconnected via various communication/control lines. A line 32A extends between the controller 18 and the PA/LD 20 (indicated by "TXI" for "transmitter current") to provide information to the controller 18 concerning the current level supplied to the laser 22 by the LDI line 27. A line 32B extends between the PA/LD 20 and the controller 18 (indicated by "LOS" for "loss of signal") to indicate when the signal received by the ROSA 16 is below detectable levels. A line 32C extends between the PA/LD 20 and the controller 18 (indicated by "TXD" for "transmitter disable") to allow the controller to disable operation of the TOSA 14 when transmission of an optical signal is not desired. Communication lines 32D extending from the controller 18 can be connected with a host device (not shown) to provide identification information and other data relating to transceiver operation to the host device.

Note that the presence of the lines described above are exemplary in accordance with one embodiment of the present invention; thus, the particular implementation of control and communication lines as illustrated in FIGS. 1-3 are not meant to limit the present invention in any way. Thus, alternative or additional lines can also be included.

FIG. 1 further illustrates a digital interface according to one embodiment of the present invention. In the illustrated embodiment, this digital interface comprises a digital serial interface 50 interposed between and interconnecting the PA/LD 20 and the controller 18. As discussed, the digital serial interface 50 enables digital control of transceiver operations by the controller 18. Further details concerning the digital serial interface 50 will be given hereafter.

Reference is now made to FIG. 2, which depicts various aspects of the controller 18. In one embodiment, the controller 18 comprises an integrated circuit disposed on the PCB 12 and having various sub-components, some of which are explained here. The controller 18 includes a glue logic device 34 responsible for managing and distributing controller data and digital control signals relating to the operation of transceiver components, such as the integrated PA/LD 20. A memory component 35 comprising memory arrays, registers, or a combination of both, is disposed in the controller 18 to enable information relating to the operation of the transceiver 10 to be stored. The information stored in the memory component 35 can be gathered from the TOSA 14, ROSA 16, the PA/LD 20, or from various other transceiver components. In one embodiment, the information stored by the memory component 35 can be forwarded to the host device via the communication lines 32D.

The controller 18 further includes various interfacing components to enable the controller to communicate with various devices. For example, digital input/output nodes 33A are disposed on the controller to facilitate communication between the memory component 35 and host device (not shown) via communication lines 32D. Data signals sent from the TOSA 14, the ROSA 16, and the PA/LD 20 via communication/control lines 25, 29, and 32A, respectively, are received by the controller 18 via an interface 33B. In a similar manner, signals carried on lines 32B and 32C relating to the receiver loss of signal and transmitter disabling can be received and dispensed by the controller 18 via a digital input-output interface 33C. Finally, a digital node 50A of the digital serial interface 50 is disposed on the controller 18 to interface with a corresponding digital node on the PA/LD 20 via the digital signal lines 52 in accordance with one embodiment of the present invention and as described in further detail below.

It should be remembered that the above interfacing configuration as shown in FIG. 2 is but one possible configuration for the various inputs and outputs associated with the operation of the controller 18. Accordingly, the above description should not be construed to limit the present invention in any way. Furthermore, several of the input and output signals discussed above are either digital or analog; however, the digital or analog nature of any specific signal can be modified from what is illustrated or described herein as may suit a particular application.

As already mentioned, one of the primary responsibilities of the controller 18 is to govern the operation of the TOSA 14 and ROSA 16 such that the electrical and optical signals associated therewith are properly converted, transmitted, and received in relation to the communications network and connected devices. The controller 18 governs the TOSA 14 and ROSA 16 via control components disposed in the PA/LD 20 as detailed below. The PA/LD control components are governed by the controller 18 via control signals that are transmitted from the controller to the components. In accordance with one embodiment of the present invention, the transmission of these control signals to the PA/LD 20 is performed digitally via the digital serial interface 50. Digital transmission of the control signals enables enhanced control of transceiver operations while minimizing the amount of control lines needed for such control. The glue logic device 34 is disposed as a component of the controller 18 to organize and arrange these digital control signals produced by the controller 18 before digital transmission to the PA/LD 20. Further details concerning the digital transmission of the control signals via the digital serial interface 50 are given below.

Reference is now made to FIG. 3, which depicts various aspects of the PA/LD 20. As already mentioned, the PA/LD 20 is disposed as an integrated circuit on the PCB 12 and is configured to condition data signals that are to be transmitted or that have been received by the optical transceiver 10. In presently preferred embodiments, the PA/LD 20 is an integrated device, in contrast to known optical transceivers that dispose the post-amplifier as a separate component from the laser driver. Integration of the post-amplifier and the laser driver into a single integrated circuit on the PCB 12 simplifies transceiver design and minimizes pin connections therein. Further details regarding the integrated post-amplifier/laser driver are given in the United States patent application entitled "Integrated Post-Amplifier and Laser Driver Assembly with Digital Control Interface," serial number pending, which is filed simultaneously herewith, and which is incorporated herein by reference in its entirety. It is appreciated that, in other embodiments, the post-amplifier and the laser driver can be disposed on the PCB 12 as discrete components.

As already mentioned, a plurality of control devices is disposed within the PA/LD 20 to control operational parameters of both the TOSA 14 and the ROSA 16. In particular, control amplifiers 36, 38, 40, and 46 are used to modify as needed the operational parameters of the optical transceiver 10. Particularly, the control amplifiers 36, 38, 40, and 46 are employed to modify operational parameters related to the TOSA 14, loss of signal circuitry, the ROSA 16, and the laser bias current, respectively. Various other circuitry and devices 47 are disposed on or in relation to the PA/LD 20 to assist with the operation of the PA/LD as described herein.

In greater detail, the control amplifier 36 is configured to modify parameters associated with electrical data signals received from a host device connected to the optical transceiver. These electrical data signals represent information from the host device that is to be converted to an optical signal and transmitted via the optical communications network to a remote device. As seen in FIG. 3, the incoming electrical data signal from the host device enters the PA/LD 20 and the control amplifier 36 via two opposite-polarity data lines 26A. The control amplifier 36 is configured to condition and amplify the electrical data signal before it is forwarded to the TOSA 14 via two opposite-polarity data lines 26B for conversion into an optical data signal and transmission to the optical communications network. In the present embodiment, the control amplifier 36 is configured to adjust at least two parameters of the electrical data signal. Specifically, the control amplifier 36 is configured to adjust the rise time and amplitude of the electrical data signal received from the host device. As will be explained, the magnitude of adjustment of these parameters is controlled via control signals sent by the controller 18 to the control amplifier 36.

In contrast, the control amplifier 40 is configured to condition and amplify an electrical data signal received from the ROSA 16 via opposite-polarity data lines 31B. This electrical data signal represents information intended for the host device that has been previously converted by the ROSA 16 from an optical data signal received from the communications network. After conditioning and amplification, the electrical data signal is sent via opposite-polarity data lines 31A to a host device that is external to the optical transceiver 10. In the present embodiment, the control amplifier 40 is configured to adjust at least two parameters of the incoming electrical data signal received from the ROSA 16. Specifically, the control amplifier 40 adjusts the rise time and amplitude of the electrical data signal received from the ROSA 16. The magnitude of adjustment of these parameters is controlled via control signals sent by the controller 18 to the control amplifier 40, as detailed further below.

Similar in function to the control amplifiers 36 and 40, the control amplifier 38 is configured to condition and amplify a loss of signal alert signal sent from the PA/LD 20 via the control line 32B. As mentioned, this loss of signal alert is forwarded from the PA/LD 20 to the controller 18 when the strength of the optical signal being received from the optical network by the ROSA 16 drops below a specified level. In connection with this responsibility, the control amplifier 38 can in one embodiment also include an additional amplifier 37. At least two parameters, the threshold level and hysteresis of the loss of signal alert signal, can be modified by the control amplifier 38 according to control signals sent from the controller 18, as will be explained further below.

Finally, the control amplifier 46 is configured to condition the laser driver bias current that is supplied to the laser 22 via the current line 27. A reference voltage is supplied to the control amplifier 46 to enable current conditioning such that the laser 22 operates under ideal conditions.

It is appreciated that the number and particular configuration of the control amplifiers as described above can be varied without affecting the present invention. For instance, more or fewer control amplifiers can be utilized in the PA/LD, as well as control amplifiers that control operational parameters in addition to those discussed above. Further, control devices and other components that perform operations distinct from amplifying and conditioning transceiver signals can also be digitally controlled in accordance with the present invention. Thus, though the above discussion describes one embodiment where the present invention can be utilized, it should not be interpreted as being limiting of the invention in any way.

Continuing reference is made to FIG. 3, as well as to FIGS. 1 and 2, in describing various aspects of the present digital interface and associated components in accordance with one embodiment of the present invention. As described, the digital serial interface 50 is established between the controller 18 and the PA/LD 20 as a means for digitally transmitting digital control signals from the controller to the PA/LD, thereby enabling the controller to a digitally control the operational parameters of the control amplifiers 36, 38, 40, and 46, or other control devices. In the present embodiment, the digital serial interface 50 comprises the first node 50A disposed on the controller 18 and a second node 50B disposed on the PA/LD 20. The digital nodes 50A and 50B can comprise any acceptable type of digital interface for transferring digital data, including those conforming to I2C and SPI protocols.

Three digital signal lines 52 are interposed between the two nodes 50A and 50B to enable various digital signals to be transferred therebetween. The first of these digital lines, 52A, is configured to transfer digital control signals from the controller 18 to one or more of the control amplifiers 36, 38, 40, and 46, or other control devices disposed in the PA/LD 20. The first digital signal line 52A can also be employed in one embodiment to transfer feedback data relating to the operation of the control devices from the PA/LD 20 back to the controller 18. The second digital signal line 52B is an enable line that is employed to coordinate the transfer of data between the controller 18 and the PA/LD 20 via the first signal line 52A. The third digital signal line 52C carries a clock signal so as to allow the controller 18 and the PA/LD 20 to coordinate the timing of data sent via the data line 52A. Though three digital signal lines 52 are shown here, it is appreciated that more or fewer than three lines 52 can extend between the nodes 50A and 50B. Indeed, a single digital signal line could be utilized, if desired. Also, each of the digital signal lines can be bi-directionally configured to enable data to flow in either direction between the controller 18 and the PA/LD 20, as explained further below. Further details regarding certain aspects of the digital serial interface and related components can be found in the United States patent application entitled "Optical Transceiver Module with Multipurpose Internal Serial Bus," filed on Oct. 8, 2002 Ser. No. 10/266,870, now U.S. Pat. No. 6,912,361 which is incorporated herein by reference in its entirety.

As seen in FIG. 2, the first node 50A of the digital serial interface 50 is operably connected to the glue logic device 34 of the controller 18, as already discussed. Similarly, as seen in FIG. 3, the second node 50B of the digital serial interface 50 is operably connected to a glue logic device 44 of the PA/LD 20. The glue logic device 44 is responsible for directing control signals received from the controller 18 via the digital serial interface 50 to the proper control amplifier 36, 38, 40, or 46. Alternatively, the glue logic device 34 and 44 can comprise micro-controllers, if desired.

In addition, a plurality of digital-to-analog converters ("DACs") 43 is operably interposed between the glue logic device 44 and the control amplifiers 36, 38, 40, and 46. Each DAC 43 is configured to convert a digital control signal received from the glue logic device 44 into an analog control signal that can be used by the control amplifiers 36, 38, 40, and 46 to modify a respective operating parameter. In the present embodiment, two DACs 43 are interposed between the glue logic device 44 and each of the control amplifiers 36, 38, and 40. Specifically, in the case of control amplifier 40, one DAC 43A is disposed for converting digital signals sent from the glue logic device 44 that control the rise time of the converted data signal received by the control amplifier from the ROSA, while one DAC 43B is disposed for converting control signals relating to the amplitude of the converted data signal. In the case of control amplifier 38, DAC 43C is disposed for converting digital control signals relating to the loss of signal hysteresis, and DAC 43D for the loss of signal threshold. In the case of control amplifier 36, DAC 43E is disposed for converting digital control signals relating to the rise time of the electrical data signal to be converted and transmitted by the TOSA 14, while the DAC 43F converts digital control signals relating to the amplitude of this data signal. Finally, one DAC 43G is disposed for converting digital control signals relating to the adjustment of the laser bias current via the control amplifier 46.

As is seen above, the controller 18 is operably connected to the control amplifiers 36, 38, 40, and amplifier 46 via the glue logic 34, the digital serial interface 50, the glue logic 44, and the DACs 43. This configuration is presented as one embodiment of the present invention; other configurations that vary from that illustrated, such as the inclusion of components in addition to those described here, are also contemplated. Such other configurations include the use of more or fewer DACs than the number shown here to convert various operational parameters.

In accordance with the present embodiment, a programmable device is operably disposed in conjunction with the digital serial interface 50. The programmable device here comprises a microprocessor 100, interposed between the controller 18 and the PA/LD 20, and interconnected with the digital signal lines 52 of the digital serial interface 50, as seen in FIG. 1. The microprocessor 100 represents merely one implementation of a programmable device that can be interconnected with the digital serial interface 50; other devices can alternatively be disposed in its place. As will be explained, the microprocessor 100 cooperates with both the controller 18 and the control amplifiers 36, 38, 40, and 46 to enhance transceiver functions.

Continuing reference is made to FIGS. 1-3 in describing certain aspects of the operation of the optical transceiver 10 as described above in digitally controlling operational parameters of the control devices 36, 38, 40, and 46. During transceiver operation, the controller 18 produces digital control signals data relating to one or more of the parameters that can be modified by the control devices 36, 38, 40, and 46, as described above. These digital control signals can be produced by the glue logic device 34, or by another component of the controller 18. In the present embodiment, the glue logic device 34 can combine the digital control signal with other digital control signals to form a digital data word. For example, the digital data word can have a size of 40 bits. The 40-bit word can be parsed by the glue logic device 34 into five eight-bit sized sections. Each eight-bit word section can be programmed to carry control signal data relating to a particular operational parameter to be modified. Thus, each digital data word can comprise data to modify a plurality of operational parameters. Alternatively, other configurations for parsing and combining the digital control signals could be employed.

Once the digital data word is formed by the glue logic device 34, it is delivered to the first node 50A of the digital serial interface 50, where it is digitally transmitted to the second node 50B via the first digital signal line 52A. In the present embodiment, the digital data word is transmitted via the first signal line 52A, while the enable signal line 52B and clock signal line 52C ensure that transmission of the digital data word to the second node 50B occurs successfully and in a proper time frame.

Once the digital data word is received by the second node 50B of the digital serial interface 50, it is forwarded to the glue logic device 44 of the PA/LD 20, where it is decoded into its respective eight-bit sections and temporarily stored in memory registers, if necessary. These digital data word sections are then forwarded by the glue logic device 44 to the respective DACs 43A-G described above that correspond to the particular parameter to be modified. In one exemplary implementation, for instance, a digital data word forwarded by the glue logic device 34 of the controller 18 to the glue logic device 44 of the PA/LD 20 via the digital serial interface 50 can comprise eight-bit word sections containing, among others, a control signal in the first word section to modify the rise time operational parameter of the control amplifier 40 and a control signal in the second word section to modify the amplitude parameter of the control amplifier 36. In this case, then, the first digital data word section is forwarded to the DAC 43A, while the second section is forwarded to the DAC 43F.

Each digital data word section, once received by the respective DAC 43 to which it corresponds as determined by the glue logic device 44, is converted by the DAC from a digital control signal to an analog control signal, making it usable by the corresponding control amplifier. Each analog control signal is then forwarded from the respective DAC to the corresponding control amplifier 36, 38, 40, or 46 that is operably connected to the DAC 43. Thus, in the exemplary implementation above, the converted analog control signal from the first data word section corresponding to the rise time operating parameter is directed from DAC 43A to the control amplifier 40, while the converted analog control signal from the second data word section corresponding to the amplitude parameter is directed from DAC 43F to the control amplifier 36. The analog control signal, once received by the corresponding control amplifier, modifies the parameter setting of the amplifier. This in turn enables the amplifier 36, 38, 40, or 46 to modify the respective data, LOS, or voltage signal passing through the amplifier. The parameter setting is retained by the amplifier until modified by a subsequent control signal sent by the controller 18. In this way, digital control of the various transceiver operating parameters is achieved. Because each digital data word sent by the controller 18 can comprise word sections, with each word section containing control signals for a different control amplifier, the parameters of multiple control amplifiers can be modified nearly simultaneously. The parameter modification process described above can be configured to occur periodically on a time increment basis. Alternatively, it can be configured to occur in response to an event detected by the controller 18 or by some other component.

In addition to the digital signal lines 52 that interconnect the PA/LD 20 with the controller 18, additional signal lines, such as receiver loss of signal line 32B and the transmitter disable line 32C, can also be configured as digital signal lines and routed to the controller 18 via the digital serial interface 50, or via other means, to enable masking and other conditioning of these digital signals to occur.

Figure 4A:
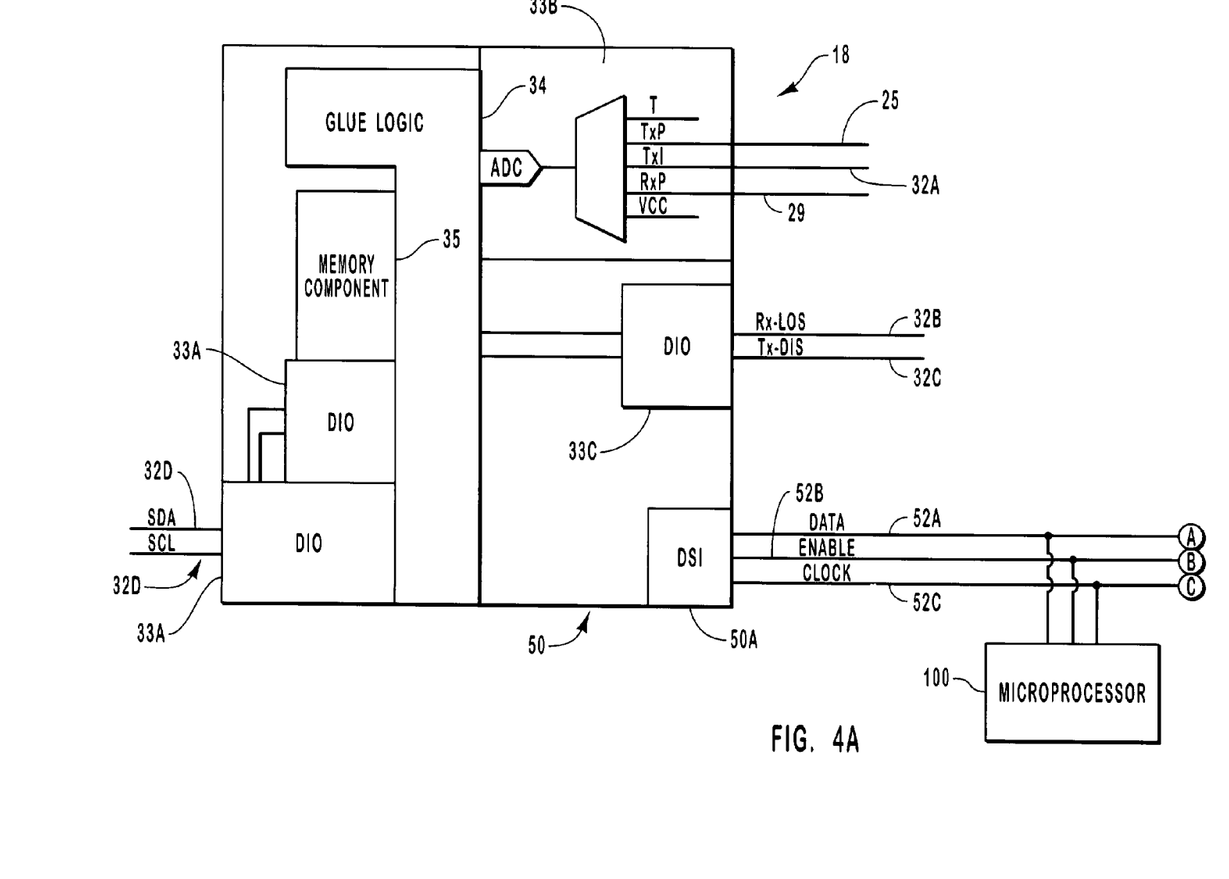
FIG. 4A is a schematic view of a controller and microprocessor in accordance with one embodiment of the present invention.
Figure 4B:
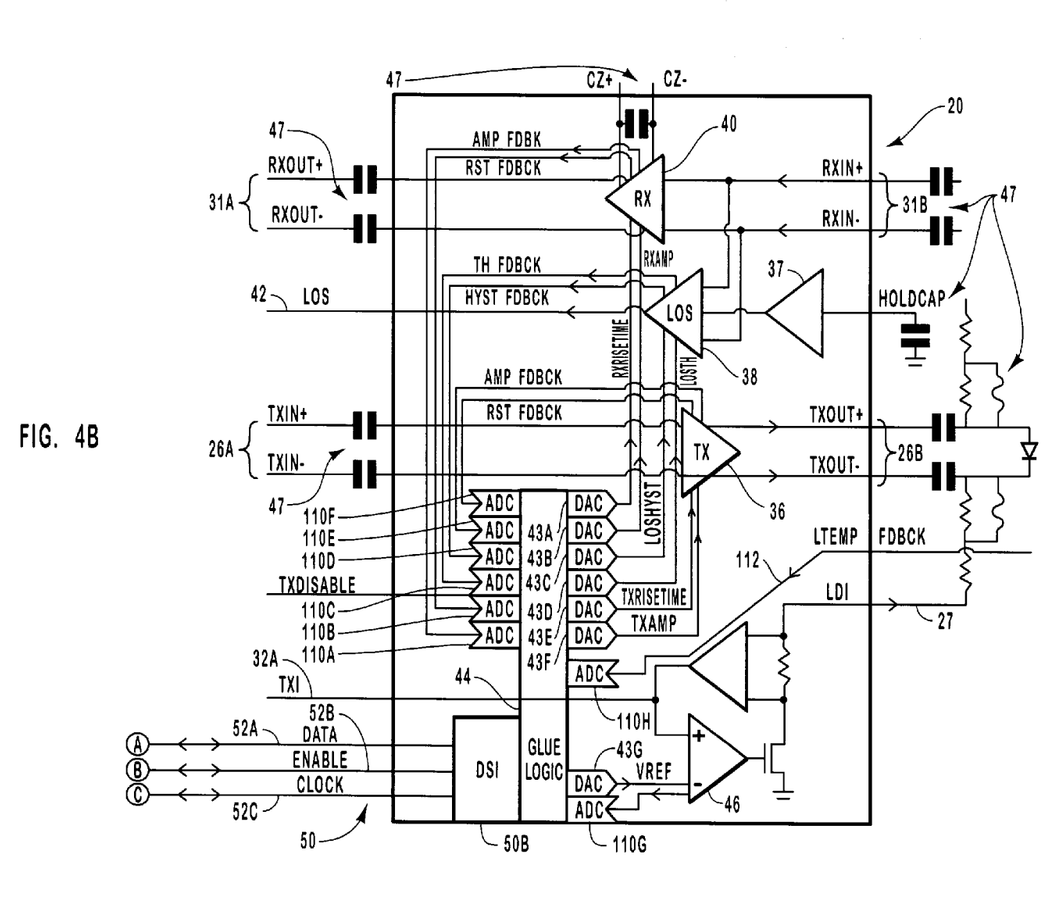
FIG. 4B is a schematic view of a post-amplifier/laser driver in operable connection with the components of FIG. 4A, in accordance with one embodiment of the present invention.

Reference is now made to FIGS. 4A and 4B, which show selected features of one embodiment of the present invention. It is noted that various of the components shown in FIGS. 4A and 4B are operably interconnected via connection points A, B, and C, respectively shown on both Figures. In presently preferred embodiments, data transfer via the digital serial interface 50 can be bi-directional, thereby enabling the controller 18 to not only send control signals to the PA/LD control amplifiers, but also to receive data from these or other devices of the PA/LD 20. In this case, the PA/LD 20 further includes a plurality of analog-to-digital converters ("ADCs") 110 disposed between the control amplifiers 36, 38, 40, and 46, and the glue logic device 44, and between the glue logic device and other transceiver components. These ADCs 110 can convert analog signals received from transceiver devices, such as the control amplifiers 36, 38, 40, and 46, into digital signals for transmission to the controller 18 via the glue logic device 44 and digital serial interface 50. Such feedback can enable the controller 18 to adjust or modify the control amplifiers 36, 38, 40, and 46 in direct response to conditions reported by the amplifiers themselves, as will be explained.

Eight ADCs 110 are shown in FIG. 4B according to one embodiment. Two ADCs 110 are interposed between each of the control amplifiers 36, 38, and 40 and the glue logic device 44. In the case of the control amplifier 40, ADCs 110A and 110B are disposed to convert analog feedback signals relating to the amplitude and the rise time, respectively, of the data signal that is conditioned by the amplifier and carried on data lines 31A and 31B. In the case of the control amplifier 38, ADCs 110C and 110D are disposed to convert analog feedback signals relating to the threshold and hysteresis parameters, respectively, of the loss of signal alert signal that is conditioned by the amplifier and carried on data line 42. In the case of the control amplifier 36, ADCs 110E and 110F are disposed to convert analog feedback signals relating to the amplitude and rise time, respectively, of the data signal that is conditioned by the amplifier and carried on data lines 26A and 26B.

In contrast to the control amplifiers described above, only one ADC 110G is interposed between the control amplifier 46 and the glue logic device 44. The ADC 110G is configured to convert analog feedback signals received from the control amplifier 46 before signal input into the glue logic device 44.

Additionally, various ADCs can be disposed in relation to other transceiver devices as well. In the illustrated embodiment, for instance, an ADC 110H is interposed between the glue logic device 44 and the TOSA 14 (see FIG. 1). A laser temperature signal line 112 connects the ADC 110H to the laser 22 (see FIG. 1) of the TOSA 14. Associated circuitry disposed in the TOSA 14 enables feedback signals relating to the operating temperature of the laser 22 to be relayed from the TOSA to the ADC 110H via the laser temperature signal line 112 for digital conversion by the ADC. This digital feedback can then be utilized by the microprocessor 100 and the controller 18 as explained further below. This illustrates but one transceiver component that can be configured to relay analog signals to an associated ADC for conversion into digital signals for subsequent use by the microprocessor 100 and the controller 18. Other configurations are also possible in accordance with the principles taught herein.

In accordance with embodiments of the present invention, the above analog feedback signals, produced by the various transceiver devices and converted by the ADCs 110 into digital feedback signals, can be intercepted en route to the controller 18 by the microprocessor 100. The microprocessor 100 is configured to receive the digital feedback signals and perform any number of specified operations thereto in order to enhance both the control and operational breadth of the optical transceiver 10. In presently preferred embodiments, the microprocessor 100 generally comprises a programmable device and is interposed between the controller 18 and the PA/LD 20, as seen in FIGS. 4A and 4B. The microprocessor 100 is operably interconnected with the digital serial interface 50, and more particularly with each of the digital signal lines 52A, 52B, and 52C. This arrangement enables the microprocessor to receive and transmit digital signals via the digital serial interface 50. As already mentioned, these digital signals can comprise feedback signals from transceiver devices disposed on the PA/LD 20, such as the control amplifiers 36, 38, 40, and 46, that are being directed to the controller 18, as well as control signals sent by the controller 18 to the PA/LD devices. Advantageously, the interposition of the microprocessor 100 between both the controller 18 and the PA/LD 20 via the bi-directional digital serial interface 50 enables the microprocessor to operate as a means for intercepting digital control signals and digital feedback signals that are transmitted via the digital interface, as will be seen.

As mentioned, the microprocessor 100 is utilized to improve transceiver operation. In particular, the microprocessor 100 can enhance the ability of the controller 18 to control transceiver functions, as described herein. In a first implementation, the microprocessor 100 can be utilized to analyze and manipulate feedback signals that are transmitted from any one of a plurality of transceiver devices. The analysis and manipulation of these feedback signals by the microprocessor 100 before they are received by the controller 18 can be designed so as to enable the controller to optimally govern transceiver operation.

The following example illustrates the first implementation of the microprocessor 100 as just described. In this example, a transceiver device, such as the control amplifier 36 seen in FIG. 4B, can produce a feedback signal during operation of the optical transceiver 10. Here, the feedback signal produced by the control amplifier relates to the amplitude currently being imposed by the control amplifier on the data signal passing therethrough via the signal lines 26A and 26B. This amplitude feedback signal, which is analog in nature due to the design of the control amplifier 36, is forwarded to the ADC 110E, where it is converted into a digital feedback signal and input into the glue logic device 44. (In some embodiments, the feedback signal can be combined with other feedback signals from other devices to form a digital feedback word, if desired.) This digital feedback signal is then forwarded by the glue logic device 44 to the second node 50B of the digital serial interface 50. From here, the digital feedback signal is directed toward the controller 18 via the digital data line 52A. Note that in the present embodiment, only one digital data line 52A is employed to transmit data to and from the PA/LD 20. However, it is appreciated that two or more data lines could be employed if desired. In one embodiment, for example, one digital data signal line could be used for one-way communications from the controller to the PA/LD 20, while a second digital data signal line could be employed for communications in the opposite direction.

Once the digital feedback signal originating from the control amplifier 36 is transmitted along the digital data signal line 52A, it can be intercepted by the microprocessor 100. Any associated clock or system enable signals being transmitted via signal lines 52B or 52C in connection with the feedback signal can also be intercepted by the microprocessor 100.

After it has captured the feedback signal(s), the microprocessor 100 can analyze and process the signals according to programmed instructions previously loaded into the microprocessor. These instructions can be modifiable or fixed, according to the needs of the particular application involved. Using the above example, a digital feedback signal received from the control amplifier 36 can contain information regarding the amplitude of a data signal being sent to the TOSA 14 for conversion into an optical signal and subsequent transmission via the optical communications network. This amplitude information can be analyzed and modified by the microprocessor 100 according to specified operations programmed into the microprocessor. Examples of such specified operations include the execution of algorithmic calculations, and the comparison of feedback data to data previously stored in the microprocessor or associated device. Significantly, such operations are performed by the microprocessor at significantly high speeds, thereby reducing delay in transmission of the feedback signal from the control amplifier 36 to the controller 18.

After the desired operations have been performed, the altered digital feedback signal and/or data relating thereto is forwarded by the microprocessor 100 to the controller 18 via the digital data signal line 52A. The controller 18 can then use the feedback and data to determine if changes to the operational parameters of any transceiver devices are needed in light of the feedback and data. If so, the controller 18 can modify the control settings of the control amplifier 36 or other device via a digital control signal sent to the amplifier or device in the manner described above in connection with FIG. 3. In this way, the microprocessor 100 of the present invention facilitates enhanced control over the various transceiver components by providing feedback signals and associated data derived from high-speed microprocessor calculations to the controller 18 via the digital serial interface 50. These digital feedback signals and data, which provide real time information to the controller 18, can then be used by the controller to optimally modify operational parameters of the transceiver components.

In yet another example illustrating application of the microprocessor 100 in accordance with the first implementation above, digital feedback from the TOSA 14 is utilized. In this example, analog feedback signals regarding the operating temperature of the laser 22 are received from the TOSA 14 via the laser temperature signal line 112. These analog feedback signals are received and converted into digital feedback signals by the ADC 110H before being input into the glue logic device 44 and sent to the microprocessor 100 via the digital serial interface 50. Once received by the microprocessor 100, detailed analysis of the laser temperature information contained in the digital feedback signal is performed. Such analysis may comprise the processing of the laser temperature data with various algorithms, or comparing it with other feedback signals to determine the optimum laser operating temperature. The results of this analysis are then forwarded via the digital serial interface 50 to the controller 18, where it can be monitored by the glue logic 34 or by another component of the controller 18. The controller 18 can then modify the power setting of the laser 22 in response to the results provided it by the microprocessor 100. In this example, as in the previous example, it is thus seen that the present invention facilitates enhanced operation of the optical transceiver via the provision and processing of digital feedback signals via the microprocessor 100.

Because it is a dedicated device disposed within the optical transceiver 10 and has high-speed processing capability, the microprocessor 100 can perform analysis, monitoring, and modification operations that are not possible using the controller 18 alone. Further, because the microprocessor 100 in preferred embodiments is programmable, the operations performed by the microprocessor can be varied to suit a particular need or application by modifying the instructions that govern microprocessor operation. These instructions can be stored in the microprocessor 100 itself, or in a storage location accessible by the microprocessor.

In some embodiments, the microprocessor 100 can also be used to input and process digital control signals from the controller 18, in addition to the feedback signals described above. For instance, the microprocessor 100 could receive and analyze one digital control signal sent from the controller 18 before forwarding it to the device for which it is intended. The data relating to the analysis of this first digital control signal can then be sent back to the controller 18, which can use the data to optimally set the succeeding control signal. Accordingly, it is seen that various other configurations and uses of the present invention beyond that which is described here are also contemplated.

In a second implementation of the present invention, the microprocessor 100 can be utilized to optimize the memory content of the controller 18. As already described, the controller 18 includes the memory component 35, which is capable of storing various data relating to operation of the transceiver 10. In the present embodiment, the memory component 35 comprises a four-kilobyte EEPROM memory device, though other types of memory components can also be employed. A host device (not shown) connected to the transceiver 10 can access the contents of the memory component 35 during transceiver operation in order to acquire needed information.

In accordance with this second implementation, the microprocessor 100 can be configured to receive feedback data relating to an operating parameter of the transceiver 10 via the digital serial interface 50, as stated earlier. The microprocessor 100, after receiving the data, can then analyze it, compile it, or even combine it with other operating parameter feedback data from other transceiver components. For instance, in one embodiment feedback signal data relating to the operating temperature of the laser 22 can be fed from the TOSA 14 to the microprocessor 100, as described earlier. This data can be combined with voltage feedback signal data from the control amplifier 46 via ADC 110G, as well as feedback via the ADC 110F relating to the rise time of the data signal passing through the control amplifier 36. The microprocessor 100 can be configured to process these three feedback signals via one or more algorithms loaded therein. This processing produces data that can be used by the host device connected to the transceiver 10.

The resulting data of this analysis performed by the microprocessor 100 are forwarded to one or more specified locations disposed in the memory component 35 of the controller 18. The host device, being previously instructed as to where the desired data is disposed, can then query the controller 18 and acquire the data within the memory component 35. This process can be performed for a variety of single or combination feedback signals, according to the specific application involved. Thus it is seen the second implementation of the present invention maximizes the utilization of the memory component 35 in creating and storing data relating to transceiver operation.

It is appreciated that the microprocessor 100 can be configured such that it can simultaneously perform multiple tasks in accordance with the first implementation above. In other words, the microprocessor 100 is capable of processing and analyzing feedback signals from transceiver components while, at the same time, processing and analyzing digital control signals from the controller 18. Furthermore, the microprocessor 100 can be configured to perform tasks in accordance with the first and second implementations simultaneously as well. For example, the microcontroller can intercept and process digital control signals while, at the same time, processing and analyzing feedback content to be forwarded to the memory component 35.

Again, because is programmable, the data collected by the microprocessor 100 can be selected, compiled, or analyzed in any one of a variety of ways as may suit a particular application. Advantageously, this in turn enables storage of data on the controller 18 to be customized to the needs of a particular customer.

It is to be remembered that the two implementations discussed above in connection with the microprocessor 100 are merely exemplary; utilization of the microprocessor in connection with the presently disclosed transceiver enables a wide range of expanded functionality to be achieved within the bounds of the present invention. One example of additional functionality possible with the present invention includes the accessing of digital content disposed on the controller by the microprocessor, a task not possible with analog signals. Finally, it is appreciated that any one of a variety of programmable devices can be employed in connection with the present embodiment. Significantly, such programmable devices can expand the utility of the controller despite their relatively low cost. This represents an overall cost savings in manufacturing the present transceiver.

Advantages gained from the present invention include simpler IC design, which results in reduced fabrication costs for the optical transceiver module. Less space is occupied by the present design, enabling more flexibility in transceiver manufacture. Further, the incorporation of the microprocessor in conjunction with the controller enables the high-speed functionality of the controller to be combined with the programmable flexibility of the microprocessor, thereby expanding the utility of the optical transceiver. Moreover, the use of digital control and feedback signals within the transceiver significantly simplifies the interoperation of the various components disposed therein.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical transceiver module, comprising:
   an optical transmitter assembly;
   an optical receiver assembly; and
   a printed circuit board having disposed thereon:
     a controller capable of producing control signals;
     a post amplifier that includes at least one control device capable of modifying an operating parameter in response to a control signal;
     a laser driver that includes at least one control device capable of modifying an operating parameter in response to a control signal;
     at least one feedback device disposed in at least one of the post-amplifier and the laser driver, the feedback device capable of producing feedback signals;
     a digital signal interface component configured to allow digital transmission of the control signals and the feedback signals between the controller and at least one of the post amplifier and the laser driver; and
     a programmable device configured to intercept and perform specified operations on the control signals and the feedback signals that are transmitted via the digital serial interface between the controller and at least one of the post amplifier and the laser driver.

2. An optical transceiver module as defined in claim 1, wherein the control signals produced by the controller are in a digital format, and wherein the feedback signals produced by the at least one feedback device are in an analog format.

3. An optical transceiver module as defined in claim 2, further comprising an analog-to-digital signal converter capable of converting the analog feedback signal to digital feedback signals for transmission via the digital signal interface.

4. An optical transceiver module as defined in claim 2, wherein the post amplifier and the laser driver component are integrated and together comprise a single integrated circuit disposed on the printed circuit board, and wherein the digital signal interface is configured to allow transmission of digital control signals and digital feedback signals between the controller and the integrated post-amplifier/laser driver.

5. An optical transceiver module as defined in claim 4, further comprising at least one digital-to-analog converter disposed in the integrated post-amplifier/laser driver, the at least one digital-to-analog converter configured to convert the digital control signals into analog control signals for use by at least one control device disposed on the integrated post-amplifier/laser driver.

6. An optical transceiver module as defined in claim 5, wherein multiple control devices are disposed in the integrated post-amplifier/laser driver, each of the control devices comprising an amplifier configured to modify at least one operational parameter related to the operation of the optical transceiver in response to at least one of the analog control signals.

7. An optical transceiver module as defined in claim 2, wherein the programmable device comprises a microprocessor capable of performing algorithmic calculations related to the digital feedback signals and forwarding results of the calculations related to the digital feedback signals to the controller.

8. An optical transceiver module as defined in claim 5, wherein the digital signal interface further comprises a first node disposed on the controller, a second node disposed on the integrated post-amplifier/laser driver, and at least one digital signal line interconnecting the first and second nodes, and wherein the programmable device is connected to the at least one digital signal line.

9. An optical transceiver module as defined in claim 1, wherein the programmable device utilizes instructions that can be programmed via user input.

10. An optical transceiver module as defined in claim 1, wherein the programmable device comprises a microprocessor.

11. An optical transceiver module as defined in claim 10, wherein the microprocessor is capable of performing algorithmic calculations related to the control signals and forwarding results of the calculations related to the control signals to the controller.

12. An optical transceiver module, comprising:
    an optical transmitter assembly;
    an optical receiver assembly; and
    a printed circuit board having disposed thereon:
      a controller comprising an integrated circuit, the controller capable of producing a digital control signal;
      a post amplifier configured to condition optical signals received by the optical receiver assembly, the post-amplifier including at least one control device capable of modifying an operating parameter in response to a control signal, the operating parameter related to the operation of the optical transceiver module;

a laser driver configured to condition a data signal to be transmitted by the optical transmitter assembly, the laser driver including at least one control device capable of modifying an operating parameter in response to a control signal, the operating parameter related to the operation of the optical transceiver module;

at least one feedback device disposed in at least one of the post-amplifier and the laser driver, the feedback device capable of producing an analog feedback signal;

at least one analog-to-digital signal converter capable of converting the analog feedback signal to a digital feedback signal;

a digital signal interface component operably interposed between the controller and at least one of the post amplifier and the laser driver, wherein the digital signal interface is configured to allow transmission of the digital control signal and the digital feedback signal between the controller and at least one of the post amplifier and the laser driver; and means for intercepting the digital control signal and the digital feedback signal that are transmitted via the digital signal interface, said means being further capable of analyzing and manipulating the digital control signal and the digital feedback signal in accordance with programmed instructions.

13. An optical transceiver module as defined in claim 12, wherein said means for intercepting is capable of transmitting the digital feed back signal to the controller after the programmable device has performed the specified operations on the digital feedback signal.

14. An optical transceiver module as defined in claim 12, wherein said means for intercepting is capable of transmitting the digital control signal to at least one of the control devices disposed in at least one of the post-amplifier and the laser driver after the programmable device has performed the specified operations on the digital control signal.

15. An optical transceiver module as defined in claim 12, wherein said means for intercepting comprises:

a programmable device interconnected with both the controller and at least one of the post amplifier and the laser driver, the programmable device being operable to intercept and perform specified operations on digital control signals and digital feedback signals that are transmitted via the digital serial interface between the controller and at least one of the post amplifier and the laser driver.

16. An optical transceiver module as defined in claim 15, wherein the programmable device contains instructions that can be programmed via user input.

17. An optical transceiver module, comprising:

an optical signal transmitter assembly capable of transmitting optical signals to the optical communications network;

an optical signal receiver assembly capable of receiving optical signals from the optical communications network; and a printed circuit board having disposed thereon:

an integrated post-amplifier/laser driver disposed as a single integrated circuit on the printed circuit board, the post-amplifier/laser driver including at least one control device capable of modifying an operating parameter of the transceiver module in response to a control signal, the post-amplifier/laser driver further comprising at least one feedback device capable of producing analog feedback signals relating to an operating parameter of the transceiver module;

at least one analog-to-digital converter configured to convert the analog feedback signals into digital feedback signals;

a controller capable of producing and transmitting digital control signals, the controller also capable of receiving the digital feedback signals produced by the at least one feedback device;

a digital signal interface operably interposed between the controller and the post-amplifier/laser driver, wherein the digital signal interface is configured to transmit the digital control signals and the digital feedback signals between the controller and the post-amplifier/laser driver; and a programmable device interconnected with the controller and the post-amplifier/laser driver via the digital signal interface, the programmable device capable of receiving both the digital control signals and the digital feedback signals transmitted via the digital signal interface, wherein the programmable device is configured to perform specified operations on at least one of the digital control signals and the digital feedback signals, and wherein the programmable device is capable of forwarding information related to the specified operation performed on at least one of the digital control signals and the digital feedback signals to the controller and post-amplifier/laser driver.

18. An optical transceiver module as defined in claim 17, wherein the digital signal interface comprises a first node disposed on the controller, a second node disposed on the integrated post-amplifier/laser driver, and at least one digital signal line connecting the first node with the second node.

19. An optical transceiver module as defined in claim 18, wherein three digital signal lines interconnect the first and second nodes, the programmable device being connected to each of the three digital signal lines.

20. An optical transceiver module as defined in claim 19, further comprising a first logic device connected to the first node of the digital signal interface, the first logic device configured to forward the digital control signals from the controller to the first node, the first logic device also configured to receive the digital feedback signals from the first node.

21. An optical transceiver module as defined in claim 20, further comprising a second logic device connected to the second node of the digital signal interface, the second logic device configured to distribute digital control signals received from the second node to the at least one control device, the second logic device also configured to forward the digital feedback signals to the second node.

22. An optical transceiver module as defined in claim 21, wherein the second logic device is capable of combining the digital feedback signals from a plurality of feedback devices into a digital word before transmission via the digital signal interface.

23. An optical transceiver module as defined in claim 22, further comprising at least one digital-to-analog converter in communication with the second logic device, the at least one digital-to-analog converter configured to convert the digital control signals to analog control signals after transmission via the digital signal interface, the analog control signals configured for use by the at least one control device of the post-amplifier/laser driver.

24. An optical transceiver module as defined in claim 23, wherein the at least one digital-to-analog converter is disposed on the post-amplifier/laser driver.

25. An optical transceiver module as defined in claim 24, wherein one digital-to-analog converter is disposed on the post-amplifier/laser driver for each type of control signal configured for use by each control device.

26. An optical transceiver module as defined in claim 25, wherein the at least one analog-to-digital converter for converting analog feedback signals into digital feedback signals is disposed on the post-amplifier/laser driver in communication with the second logic device.

27. An optical transceiver module as defined in claim 26, wherein one analog-to-digital converter is disposed on the post-amplifier/laser driver for each type of feedback signal produced by each feedback device.

28. An optical transceiver module as defined in claim 27, wherein the feedback device that produces the analog feedback signal comprises a component disposed on the post-amplifier/laser driver.

29. An optical transceiver module as defined in claim 27, wherein the feedback device comprises a sensor capable of transmitting feedback signals relating to the temperature of a laser disposed in the transmitter optical assembly.

30. An optical transceiver module as defined in claim 27, wherein the at least one control device and the at least one feedback device comprise a unitary component.

31. An optical transceiver module as defined in claim 27, further comprising a memory component disposed on the controller, the memory component capable of storing information related to the specified operation performed on at least one of the digital feedback signals.

32. An optical transceiver as defined in claim 17, wherein the at least one control device comprises a plurality of control amplifiers, the control amplifiers comprising:

a first control amplifier configured to modify operating parameters related to optical signals to be transmitted by the optical signal transmitter assembly;

a second control amplifier configured to modify operating parameters related to incoming optical signals received by the optical signal receiver assembly; and a third control amplifier configured to modify operating parameters related to the loss of the incoming optical signals received by the optical signal receiver assembly; and a fourth control amplifier configured to modify operating parameters related to the bias current of a laser disposed in the optical signal transmitter assembly.

33. An optical transceiver module as defined in claim 32, wherein at least one of the first through fourth control amplifiers further comprises the feedback device.

34. An optical transceiver module as defined in claim 33, wherein the specified operations performed by the programmable device are performed in accordance with instructions stored in the programmable device.

35. An optical transceiver module as defined in claim 34, wherein the programmable device comprises a microprocessor capable of performing specified operations comprising algorithmic calculations related to the digital feedback signal, and wherein the microprocessor is capable of forwarding information related to the algorithmic calculations to the controller.

36. An optical transceiver module as defined in claim 35, wherein the microprocessor is capable of performing algorithmic calculations related to the digital control signal and forwarding information related to the algorithmic calculations to the controller.

37. An optical transceiver module as defined in claim 36, wherein the microprocessor is capable of performing the algorithmic calculations related to both the digital feedback signal and the digital control signal simultaneously.

* * * * *